2,801,993

EXPANDED THIOUREA

Ludwig Rosenstein and Manuel H. Gorin,
San Francisco, Calif.

No Drawing. Application August 11, 1953,
Serial No. 373,676

2 Claims. (Cl. 260—96.5)

This application is a continuation-in-part of application Serial Number 169,288, filed June 20, 1950 now abandoned. It relates to an expanded thiourea, its production and use.

It is known that thiourea will form adducts with various organic compounds in the presence of an accelerator such as an alcohol, aldehyde or ketone. The adduct-formers include carbon tetrachloride, methyl chloroform, certain isoparaffins, naphthenes, isoolefins, cycloolefins and alkylated aromatic hydrocarbons having at least one isoparaffin radical of at least six carbon atoms. One can refer to U. S. Patent No. 2,499,820 and other prior art for a more specific disclosure of the various organic compounds forming adducts with thiourea. For simplicity, we will refer to any organic compound forming an adduct with thiourea as an "adduct-former." In general, those substances which are solvents for thiourea and the adducted component are the most efficient accelerators and methanol is an example of one which has been employed.

While the prior art contains repeated emphases on the necessity of accelerators such as methanol to attain adduct formation at an appreciable rate, there is one literature reference to the formation of adducts wherein thiourea is the sole reagent; that is, adducts are formed without the aid of an accelerator. This occurs in an article by Angla (Annales de Chemie, vol. 4 (sec. 2) pg. 651; 1949. However, an examination of the data shows that Angla formed adducts of thiourea by contacting organic vapors therewith and that the times for adduct formation to take place were never less than 48 hours, and as long at 796 hours. Our invention refers to a form of thiourea which when used as the sole reagent, that is, without the well-known accelerators, will react with "adduct-formers" in a matter of minutes; in other words, in a time period commercially practical.

We have found that the use of such accelerators is not necessary to formation of an adduct with a hydrocarbon where our expanded form of thiourea is employed. As made by us, expanded thiourea is a finely divided powder having a bulk density of about 0.41 gram per cc., whereas ordinary thiourea has a bulk density of about 0.79 gram per cc., and a different appearance from thiourea, being light and fluffy rather than coarse and granular. Its outstanding characteristic is its great reactivity with respect to adduct formation when used as the sole reagent. When simply suspended in suitable hydrocarbons, for example, the adducts form completely in about 15 minutes at ordinary temperature.

Expanded thiourea can be prepared in various ways. We have made it by bringing solid thiourea into contact with an adduct-former to form an adduct and then removing the adduct-former in the absence of a thiourea solvent and leaving expanded thiourea in the solid phase. More specifically, we form the adduct with thiourea and then remove the adducted compound, usually by heating the adduct in a "neutral solvent" at a temperature below the melting point of thiourea, and removing the released adducted component. The adduct utilized can be that produced from ordinary crystalline thiourea in the absence of accelerators with such an adduct-former as $CCl_4$, methyl chloroform and the like, or from adducts which require an accelerator for their initial production with ordinary crystalline thiourea such as that from cyclohexane and thiourea.

In the latter case, care must be taken to remove all the accelerator from the adduct prior to decomposition. Where the accelerator is anhydrous methanol or other organic solvent for thiourea, this is easily done by washing the adduct with a hydrocarbon such as normal hexane, which does not form adduct with thiourea. Such washing must, of course, take place below the temperature at which adduct begins to decompose. While, as mentioned, this removal of non-aqueous accelerators is easily accomplished, it is emphasized that it is necessary and must be thorough. Any thiourea-solvent left on the adduct will preclude the attaining of our expanded thiourea in the subsequent step.

By "neutral solvent" we mean one which is a solvent for the adduct-former and not for thiourea and which does not form an adduct with thiourea. When the adduct-former is volatile it can be removed by gentle heating, evaporation of the adduct by low-pressure application even at low temperature, or by passing an inert gas stream over the solid phase to sweep away the adducted component.

The following examples are set forth as illustrative of the preparation of expanded thiourea, but the invention is not limited thereto:

EXAMPLE IA

*Preparation of expanded thiourea with $CCl_4$ by volatilization*

One hundred and fifty grams of thiourea were agitated at room temperature with 300 cc. of carbon tetrachloride. Reaction was immediately apparent from the swelling of the thiourea. After 15 minutes, the mixture had set up to a stiff suspension and stirring was discontinued. The mixture was then spread out thinly on a sheet of paper and allowed to dry at room temperature until all the wetting of the paper by the solid had disappeared. At this stage, the adduct weighed 224.8 grams and contained 33.3% by weight of $CCl_4$. It was again spread out thinly on a sheet of paper and allowed to remain in contact with air at room temperature for 24 hours, after which time it had returned to its original weight of 150 grams and had lost all the $CCl_4$ originally present in the adduct. At this stage, the thiourea has a very different physical appearance than ordinary thiourea, being light and fluffy instead of dense and granular and having a gross volume approximating that of the original adduct. The expanded thiourea had an apparent density of 0.41 gram per cc. The fluffiness and low bulk density are characteristic of our expanded thiourea. Mere reduction of particle size, such as may be accomplished by physical means alone, never results in a similar product.

The great reactivity of this expanded thiourea was demonstrated by its ability to form adducts with certain hydrocarbons in kerosene. The 150 grams of expanded thiourea prepared as above were agitated with 1500 cc. of kerosene at room temperature. Reaction was almost immediately apparent with the solid phase swelling to occupy a large part of the liquid volume. After agitating for one hour, the mixture was filtered and the solid phase washed with three 100 cc. portions of methylene chloride (a neutral solvent). The adduct was air dried over night and then weighed 199.5 grams.

By analysis the adduct was found to contain 24.9% of kerosene hydrocarbons.

EXAMPLE IB

If ordinary crystalline thiourea is held in contact with kerosene at room temperature, no appreciable reaction occurs even over many hours. That adduct formation between ordinary thiourea and kerosene can be induced by use of an accelerator such as methanol is illustrated by the following example: 100 grams of thiourea were agitated with 500 cc. of kerosene plus 50 cc. methanol for one hour at room temperature. The mixture was filtered and then washed with three portions of hexane of 30 cc. each. The solid was much fluffier than the original crystalline thiourea, but not as fluffy as that obtained from expanded thiourea. After air drying, it weighed 110.5 grams and contained 9.50% kerosene hydrocarbons. It will be noted that the expanded thiourea of Example I took up 2½ times as much hydrocarbon as did the ordinary thiourea with accelerator, which is a clear indication of its great reactivity.

The kerosene hydrocarbons, adducted with only active thiourea, as set forth above in Example IA, were recovered by contacting the adduct produced from expanded thiourea with boiling benzol in a Soxhlet extractor. Decomposition of the adduct was essentially complete after eight overflows. The kerosene hydrocarbons were separated from the benzol by distillation. To characterize the hydrocarbons adducted from the kerosene by expanded thiourea, the recovered hydrocarbon liquid was distilled without reflux and collected in ten fractions. The boiling ranges and the refractive indices of the various fractions are given below in Table I, along with the results of a corresponding distillation on the original kerosene.

TABLE I

[Properties of kerosene hydrocarbons from thiourea adduct]

| Fraction No. | Percent of Total | | Boiling Range, ° C. | | $n_d^{20}$ Kerosene from Adduct | Original Kerosene |
| --- | --- | --- | --- | --- | --- | --- |
| | Kerosene from Adduct | Original Kerosene | Kerosene from Adduct | Original Kerosene | | |
| 1 | 10.0 | 10.0 | 202–212 | 180–190 | 1.4423 | 1.4356 |
| 2 | 11.4 | 10.0 | 212–216 | 190–198 | 1.4430 | 1.4380 |
| 3 | 10.0 | 10.0 | 216–221 | 198–206 | 1.4434 | 1.4398 |
| 4 | 10.0 | 10.0 | 221–223 | 206–214 | 1.4442 | 1.4417 |
| 5 | 10.6 | 13.0 | 223–227.5 | 214–219 | 1.4451 | 1.4431 |
| 6 | 10.0 | 11.0 | 227.5–231.5 | 219–229 | 1.4461 | 1.4450 |
| 7 | 10.0 | 10.0 | 231.5–238 | 229–236 | 1.4471 | 1.4460 |
| 8 | 10.0 | 10.0 | 238–245.5 | 236–241 | 1.4483 | 1.4476 |
| 9 | 10.2 | 10.0 | 245.5–259.5 | 241–258 | 1.4500 | 1.4493 |
| 10 | 6.4 | 6.0 | 259.5–271 | 258 up | 1.4523 | 1.4529 |
| 11 | 1.0 | | 271 up | | 1.4564 | |
| | 99.6 | 100.0 | | | | |

From Table I it is apparent that the kerosene from the adduct has a higher initial boiling point and has a somewhat narrower boiling range than the original kerosene. Since the kerosene was in large excess with respect to the thiourea, a selective effect was obtained in which the hydrocarbon types forming the strongest adducts were concentrated by the thiourea. While the exact structural types of the hydrocarbons being adducted cannot be determined from the available data, it is indicated that they are primarily cyclopentyl and/or cyclohexyl aliphatic derivatives of the general type.

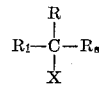

where R, $R_1$ and $R_s$ are short straight chain aliphatic radicals, short or fairly long chain branched aliphatic radicals or hydrogen and X is cyclopentyl, cyclohexyl, methyl cyclopentyl, methyl cyclohexyl, etc.

The thiourea recovered from the kerosene adduct by benzol extraction was also expanded thiourea, being light and fluffy, and having an apparent density of 0.44 gram per cc. Its activity toward cyclohexane is demonstrated by Example II.

EXAMPLE II

*Reactivity of expanded thiourea produced by contacting adduct with hot neutral solvent*

20 grams of the thiourea produced as in Example IB by refluxing a kerosene-thiourea adduct with benzol was agitated with 100 cc. of cyclohexane for one hour at room temperature. Swelling of the solid phase was almost immediately apparent. The mixture was filtered and the adduct air dried until powdery; the weight of adduct was 26.4 grams.

Cyclohexane does not form an adduct readily with ordinary crystalline thiourea in the absence of an accelerator. Thus, when 20 grams of ordinary thiourea were agitated with 100 cc. of cyclohexane for one hour at room temperature, no change in the nature or appearance of the solid phase was apparent and the solid phase recovered by filtration and air drying showed no appreciable gain in weight.

EXAMPLE III

*Expanded thiourea by chloroform and methanol*

Twenty grams of ordinary crystalline thiourea were agitated at room temperature for one hour with 100 cc. of chloroform plus 5 cc. of methanol. Swelling of the solid was apparent but the mixture was not as thick as when strong adduct formation takes place such as with cyclohexane, carbon tetrachloride, methyl chloroform, chloropicrin, etc. The mixture was filtered and washed with three 10 cc. portions of methylene chloride and air dried until powdery. The weight of the solid phase was 19.9 grams. Evaporation of the filtrate showed that 0.1 gram of thiourea had gone into solution. Thus no chloroform remained in the solid phase.

The reactivity of the thiourea thus produced toward cyclohexane was shown by agitating it with 100 cc. of cyclohexane at room temperature. Immediately upon mixing, the solid swelled to occupy the whole liquid volume. The mixture was agitated at room temperature for one hour and then filtered and air dried until powdery. The weight of the adduct was 26.4 grams.

Agitating ordinary crystalline thiourea with chloroform alone does not activate the thiourea. Thus, when 20 grams of thiourea were agitated with 100 cc. of chloroform, no change in appearance or weight of the solid phase occurred. The solid phase after air drying was then suspended in cyclohexane. No swelling or appreciable change in weight occurred. The presence of methanol is necessary to formation of the expanded thiourea in the presence of chloroform. The methanol concentration required is low, of the order of 1% to 10% on the chloroform volume and about a fifth of this on the thiurea quantity, though more can be used if desired.

While the contact between the thiourea and choloroform-methanol solution was maineteined for one hour, it was apparent that the action was substantially complete in ten minutes.

Expanded thiourea has been prepared by evaporation of volatile adducted components from a thiourea adduct with cyclohexane, cyclohexanone, methyl chloroform and chloropicrin, as well as from carbon tetrachloride adduct. Evaporation of the adducted component can be hastened by increasing the temperature and/or the circulation of inert gas around the adduct. Thus, the carbon tetrachloride-thiourea adduct loses its CCl4 in about two hours at 65° C. when spread out in a watch glass. The thiourea thus formed is also highly reactive toward certain kerosene hydrocarbons.

The reactivity of the expanded thiourea depends upon its mode of preparation. In the method of producing expanded thiourea consisting of contacting adduct with a hot solvent for the adduct-former, the nature of the solvent, the temperature and time of contact with the solvent will each affect the activity of the thiourea produced.

That the method of decomposing adduct is of primary importance for the formation of the expanded, highly reactive thiourea, will be illustrated by Examples IVA and IVB, in which adduct is decomposed but the expanded form of thiourea is not produced.

EXAMPLE IVA

A saturated solution of thiourea in aqueous methanol (67% methanol—33% water) was added to 1,000 ml. of a hydrocarbon distillate (Standard Oil #250 Thinner) known to contain adductable hydrocarbons. Adduct formed rapidly. After 20 minutes agitation at room temperature the adduct was filtered by suction and rinsed under suction with 3 successive 100 ml. portions of normal hexane. Yield of adduct—108 gm. wet weight. 30 grams of this adduct were suspended in anhydrous ethyl ether, the air was expelled from the container, which was then heated under pressure to 65° C.–73° C. for one hour. The container and contents were now rapidly cooled. The solid was filtered by suction and rinsed with ether. After drying at room temperature, it was seen to consist of coarsely crystalline thiourea. Its reactivity was tested by suspending 10 grams in kerosene of the same grade as that used in Experiment IA. It was agitated for one hour at room temperature and left in contact with the kerosene over night. The weight of recovered solid was 10 grams and its character remained unchanged.

The preparation of adduct and its decomposition described in this example follows closely the directions given in U. S. Patent No. 2,499,820, col. 8, lines 50–65; col. 13, lines 40–56 and lines 71–75; col. 15, lines 39–49. It is clear that production of expanded highly reactive thiourea does not result, but only the usual coarsely crystalline thiourea.

Another important observation was made in the course of this experiment. A portion of the adduct prepared as described was spread on filter paper and exposed at room temperature over night. The residue was found to be free of hydrocarbon and to be coarsely crystalline and inactive. More low temperature evaporation of adducted hydrocarbon failed to produce the expanded thiourea.

We surmise that the explanation of the failure to produce expanded thiourea is as follows:

We have previously observed that expanded thiourea slowly loses its unique reactivity and its fluffy character. At room temperature the change is quite slow, but it is catalyzed and becomes very rapid when any thiourea solvent is present. The adducts prepared as described retain some thiourea solvent (water or water-alcohol) which the rinsing failed to remove, and this resulted in the ordinary thiourea rather than the expanded form being the final product.

EXAMPLE IVB

The purpose of this experiment was to ascertain whether the heating of adduct to its decomposition temperature will necessarily produce expanded thiourea.

A saturated solution of thiourea in anhydrous methanol was added to Standard Oil #250 thinner (a straight-run distillate with initial B. P. 188° F.; 50% point 210° F.; end-point 290° F.) in equal volume and agitated at room temperature for 10 minutes. Adduct formed abundantly and was separated by suction filtration. The adduct was transferred to a distillation flask fitted with thermometer and condenser and heated to decomposition temperature. When the top temperature reached 60° C. there was evidence of decomposition in the flask with evolution of smoke and odor of hydrogen sulfide. A yellow oil begins to distil over and top temperature remained between 58° C. and 60° C. for 1½ hours, then suddenly shot up to 100° C., at which heating was discontinued. Nevertheless, the temperature continued to increase to 105° C. The flask was now cooled and contents examined. There was a strong odor of hydrogen sulfide in the flask. The solid was a greenish yellow, dense mass which in no way resembled expanded thiourea. It gave a test for thiocyanate and sulfide. It was evidently a partially decomposed, very impure, thiourea. It manifested no reactivity toward adduct forming hydrocarbons.

This experiment follows closely the directions given in U. S. Patent No. 2,549,372, col. 4, line 58 through col. 5, line 25.

Example IVA illustrates that expanded thiourea cannot be prepared from adducts which were produced by means of aqueous alcohols and other accelerators which have low solubility in hydrocarbon liquids. In explanation, the following factors are pertinent:

1. With aqueous alcohols and other accelerators of low hydrocarbon solubility, two liquid phases are present during adduct formation—a highly polar accelerator phase and a hydrocarbon phase.

2. In such systems the adduct is preferentially wetted by the highly polar phase.

3. Washing of the adduct with neutral solvent does not remove the aqueous alcohol from the adduct.

4. Unless thiourea solvents are carefully removed from the adduct, expanded thiourea is not produced.

When thiourea is combined with an adductable component, the latter has penetrated and expanded the crystal lattice, thereby changing the fundamental dimensions. When the adduct-former is removed by the action of neutral solvent or through volatilization, our expanded form of thiourea remains, provided thiourea solvents were carefully removed prior to the decomposition. The expanded form is unstable and reverts slowly at room temperature to the stable, denser form. Any thiourea solvent acts as a potent catalyst for this reversion. This is believed to be reason for failure to obtain the expanded form when thiourea solvents are not removed prior to decomposition.

The expanded thiourea exists only as a solid. As the melting point is approached, the change to the ordinary thiourea becomes practically instantaneous.

The expanded thiourea can be utilized in various ways to advantage. For example, it can be used to extract selectively naphthenes out of gasoline. By selecting a thiourea of the requisite activity, one can selectively remove cyclohexane from an appropriate gasoline fraction, subsequently separating this from the adduct and utilizing the expanded thiourea formed to recover additional cyclohexane. Cyclohexane so recovered can be dehydrogenated to provide benzene.

While the expanded thiourea produced upon decomposition of a kerosene thiourea adduct, as in Example IA, was no longer active toward kerosene upon decomposition with boiling benzene, an effective extraction can be made from kerosene and a cyclic process provided by adopting certain modifications. For example, we have successfully reformed the expanded thiourea by suspending the kerosene-thiourea adduct in carbon tetrachloride and heating sufficiently to displace the adducted hydrocarbons present in the adduct, these being replaced by the carbon tetrachloride to form a thiourea-carbon tetrachloride adduct, the released kerosene hydrocarbons passing into solution in the carbon tetrachloride remaining. The carbon tetrachloride-thiourea adduct is separated from the solution, washed free of kerosene with carbon tetrachloride, and then decomposed as by volatilization of the carbon tetrachloride to provide additional expanded thiourea. The carbon tetrachloride solution of kerosene hydrocarbons previously adducted with the expanded thiourea is then distilled and the hydrocarbons recovered separately, the carbon tetrachloride being returned for reuse.

EXAMPLE V

*Adduct formation with hydrocarbons*

To illustrate the utility of the expanded thiourea in forming adducts with various hydrocarbons, 10 grams of the expanded thiourea, prepared as described in Example I, were agitated with 50 cc. of each of the hydrocarbons set forth in the following table; the alkylate used was that of propylene tetramer with benzene. Each mixture was agitated for 30 minutes at room temperature, filtered, washed with methylene chloride, air dried and weighed. The results are shown in the following table:

TABLE II

| Adduct-former | Weight of Adduct Formed (grams) | Percent of Adduct-former |
|---|---|---|
| Isooctene (Diisobutylene) | 12.8 | 21.9 |
| Isooctane (2,2,4-trimethylpentane) | 12.1 | 17.3 |
| Decalin | 13.9 | 28.0 |
| Alkylate | 12.5 | 20.0 |

Each adduct had an odor distinctive of the compound forming the adduct.

The uniqueness of the expanded thiourea of this invention is further illustrated by the fact that it forms an adduct with decalin, whereas ordinary thiourea with an accelerator does not form an adduct. Illustrative of this is the following:

EXAMPLE VI 10 grams of ordinary crystalline thiourea were mixed with 50 cc. of decalin and 5 cc. of methanol. The material was agitated for an hour at room temperature. No change in weight or appearance occurred in the thiourea.

From the foregoing it should be apparent that our expanded thiourea is capable of many wide and varied applications for separation of organic compounds.

We claim:

1. A process for making expanded thiourea in the form of a light and fluffy powder having a bulk density of about 0.41 gram per cubic centimeter, which comprises first preparing a thiourea adduct by reacting crystalline thiourea with a volatile organic compound selected from the group consisting of branched chain hydrocarbons of not less than seven carbon atoms, cyclo paraffins of not less than six carbon atoms, alkylated aromatic hydrocarbons having at least one side chain of at least six carbon atoms; using a minor amount of a non-aqueous organic solvent for thiourea to accelerate adduct formation; removing the solid phase by filtration; washing the solid phase with hexane to remove the adherent accelerator; decomposing the purified thiourea adduct by heating to a temperature below the melting point of thiourea until the vapors of hexane and of the adducted compound are removed and a dry powder having the characteristics of said expanded thiourea is left as residue.

2. A process for making expanded thiourea in the form of a light and fluffy powder having a bulk density of about 0.41 gram per cubic centimeter, which comprises first preparing a thiourea adduct by reacting crystalline thiourea with an organic compound selected from the group consisting of branched chain hydrocarbons of not less than seven carbon atoms, cyclo paraffins of not less than six carbon atoms, alkylated aromatic hydrocarbons having at least one side-chain of at least six carbon atoms; using a minor amount of a non-aqueous organic solvent for thiourea to accelerate adduct formation; removing the solid phase by filtration; washing the solid phase with hexane to remove the adherent accelerator; decomposing the purified adduct by suspending it in a solvent for the adducted hydrocarbons, which solvent is not a solvent for thiourea and heating the suspension to a temperature below the melting point of thiourea until substantially all the adducted organic compound has passed into said solvent but not until a substantial reduction in the volume of the thiourea phase has occurred; separating the expanded thiourea from the liquid.

References Cited in the file of this patent
UNITED STATES PATENTS

| | | |
|---|---|---|
| 2,499,820 | Fetterly | Mar. 7, 1950 |
| 2,518,677 | Garner et al. | Aug. 15, 1950 |
| 2,520,716 | Fetterly | Aug. 29, 1950 |
| 2,549,372 | Fetterly | Apr. 17, 1951 |
| 2,578,054 | Fetterly | Dec. 11, 1951 |